(12) United States Patent
Dhalla et al.

(10) Patent No.: US 10,996,640 B1
(45) Date of Patent: May 4, 2021

(54) DYNAMIC ADJUSTMENT OF A PRESENTATION AREA

(71) Applicant: Amazon Technologies, Inc., Seattle, WA (US)

(72) Inventors: Nadya Dhalla, Seattle, WA (US); Kerry Patrick Person, Seattle, WA (US); Ozgur Dogan, Seattle, WA (US); Gianna Lise Puerini, Bellevue, WA (US); Steven Kessel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 16/414,653

(22) Filed: May 16, 2019

Related U.S. Application Data

(62) Division of application No. 14/311,617, filed on Jun. 23, 2014, now Pat. No. 10,303,133.

(51) Int. Cl.
| | | |
|---|---|---|
| *G06F 7/00* | (2006.01) | |
| *G05B 15/00* | (2006.01) | |
| *B65G 1/137* | (2006.01) | |
| *G05B 19/02* | (2006.01) | |
| *G05B 15/02* | (2006.01) | |
| *G05B 19/00* | (2006.01) | |
| *G06N 5/04* | (2006.01) | |

(52) U.S. Cl.
CPC ............ *G05B 15/00* (2013.01); *B65G 1/137* (2013.01); *G05B 15/02* (2013.01); *G05B 19/00* (2013.01); *G05B 19/02* (2013.01); *G06N 5/048* (2013.01)

(58) Field of Classification Search
CPC ........ G05B 15/00; G05B 19/00; G05B 15/02; G05B 19/02; B65G 1/137; G06N 5/048

USPC .......................... 700/213–216, 219, 226, 228
See application file for complete search history.

(56) References Cited

U.S. PATENT DOCUMENTS

| | | | |
|---|---|---|---|
| 7,225,980 B2 | 6/2007 | Ku et al. | |
| 7,366,586 B2 * | 4/2008 | Kaplan | G06Q 30/0238 |
| | | | 700/241 |
| 7,720,723 B2 | 5/2010 | Dicker et al. | |
| 7,826,919 B2 | 11/2010 | D'Andrea et al. | |
| 7,949,568 B2 | 5/2011 | Fano et al. | |
| 8,009,864 B2 | 8/2011 | Linaker et al. | |
| 8,175,925 B1 | 5/2012 | Rouaix et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Yolanda R Cumbess
(74) *Attorney, Agent, or Firm* — Athorus, PLLC

(57) ABSTRACT

This disclosure describes a system for presenting items to a user at a presentation area within a materials handling facility. In some instances, a predicted items list that identifies items that are likely to be picked by a user are determined and, when the user arrives at the materials handling facility, those predicted items are presented to the user for selection. For example, predicted items may be determined and inventory holders that contain the predicted items may be routed to a presentation area and positioned for presentation to the user. The user may browse the presented items and pick the items they desire.

20 Claims, 9 Drawing Sheets

(56) References Cited

U.S. PATENT DOCUMENTS

| | | | |
|---|---|---|---|
| 8,189,855 B2 | 5/2012 | Opalach et al. | |
| 8,352,400 B2 | 1/2013 | Hoffberg et al. | |
| 8,370,216 B2 | 2/2013 | Kessel et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,226,042 B1 | 12/2015 | Kramer et al. | |
| 9,285,958 B1 | 3/2016 | Hill et al. | |
| 9,473,747 B2 | 10/2016 | Kobres et al. | |
| 9,886,809 B2* | 2/2018 | Hoersten | G07F 9/002 |
| 2003/0002712 A1 | 1/2003 | Steenburgh et al. | |
| 2004/0181467 A1 | 9/2004 | Raiyani et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2010/0145507 A1 | 6/2010 | Blust et al. | |
| 2010/0314405 A1* | 12/2010 | Alvarez | G07F 7/069 221/1 |
| 2011/0011936 A1 | 1/2011 | Morandi et al. | |
| 2012/0109369 A1* | 5/2012 | Paluga | G11B 17/22 700/236 |
| 2012/0284132 A1 | 11/2012 | Kim et al. | |
| 2012/0298688 A1* | 11/2012 | Stiernagle | G06Q 10/087 221/155 |
| 2013/0076898 A1 | 3/2013 | Philippe et al. | |
| 2013/0253700 A1 | 9/2013 | Carson et al. | |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

DYNAMIC ADJUSTMENT OF A PRESENTATION AREA

PRIORITY CLAIM

This application is a Divisional of U.S. patent application Ser. No. 14/311,617, filed Jun. 23, 2014, the contents of which are herein incorporated by reference.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers, that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
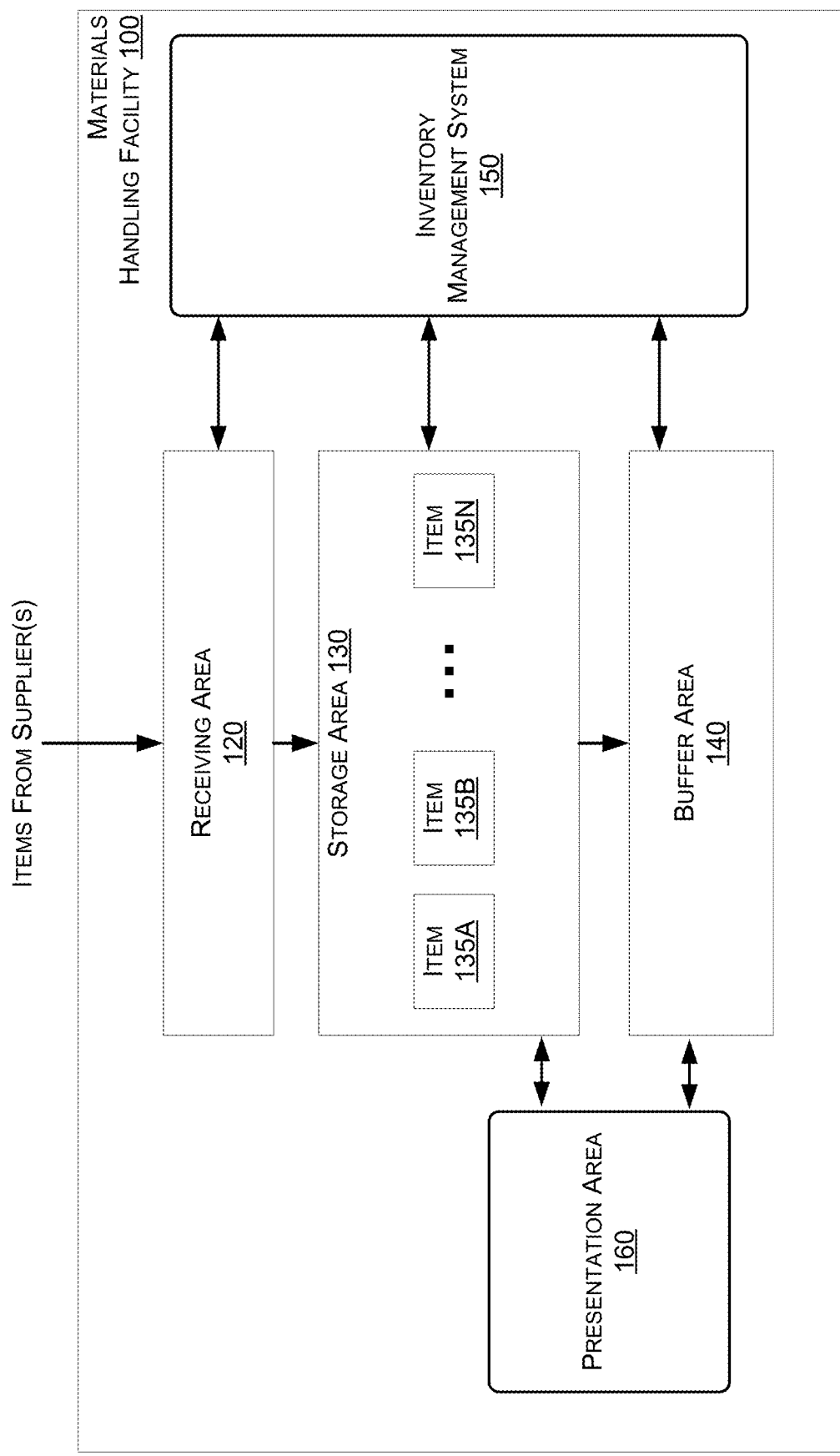
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for presenting items at a materials handling facility. In some instances, a predicted items list that identifies items that are likely to be picked by a user are determined and, when the user arrives at the materials handling facility, those items are presented to the user for selection. For example, items likely to be picked by a user may be determined and inventory holders that contain those items may be retrieved from storage areas using shuttles and transitioned to a presentation area for presentation to the user. Presentation areas may be configured, for example, as aisles of bins. Each bin may have one or more shelves and each shelf may have one or more presentation locations. Likewise, each presentation location may be configured to hold one or more inventory holders and each inventory holder may be configured to hold one or more items of inventory.

The presentation area for a particular user may vary in size based on the number and/or size of predicted items to be presented to the user. For example, the presentation area may be a single presentation location if only a few predicted items are to be presented to a user. In comparison, the presentation area may be multiple aisles if a large number of predicted items are to be presented to a user.

In some implementations, the presentation area may be dynamically configured, regardless of user. For example, a presentation area may be configured or reconfigured based on the time of day, day of week, season, holidays, weather, users in the materials handling facility, etc. For example, if a national holiday is scheduled for an upcoming weekend and users typically pick a particular type of item for that holiday (e.g., flags, charcoal, hats), the presentation area may be dynamically configured to include items often picked by users in preparation for the national holiday.

In still other locations, a presentation area may be configured based on vendor agreements. For example, vendors may have an agreement with the materials handling facility to place items at a particular location within the materials handling facility based on one or more factors. Factors may include, for example, time of day, day of week, season, holidays, weather, users in the materials handling facility, etc. For example, Vendor 1 may have an agreement with the materials handling facility to present Vendor 1 items at a front of the materials handling facility from 8:00 am-3:00 pm on Saturdays. Vendor 2 may have an agreement with the materials handling facility to present Vendor 2 items at the same presentation area (front of the materials handling facility) from 3:00 pm-10:00 pm on Saturdays. As the adjustment criteria are satisfied, the appropriate inventory holders are positioned for presentation at the presentation area according to the adjustment criteria.

Regardless of size and/or configuration of a presentation area for a user, the user may pick items they desire from the presented inventory holders. When a user picks an item from an inventory holder, the picked item is determined and an item identifier representative of the item is added to an item identifier list associated with the user. If the user places the item onto the inventory holder (or any other location within the facility), the placed item is determined and the corresponding item identifier removed from the item identifier list associated with the user.

In some implementations, a separate item presentation location may be positioned within the facility for presenting items requested by the user that are retrieved from another location (e.g., storage) within the facility. For example, if a user desires an item that is either not presented within the facility or not located near the user, the user may request that the item be presented. An inventory holder containing the item may be retrieved, transitioned to a nearby presentation location, and the item presented to the user.

In some implementations, a presentation area may include items for multiple users. For example, if two or more users have similar items identified on respective predicted items lists, the predicted items from each user's predicted items list may be positioned at a presentation area and each user may browse and pick items from the presentation area.

In some implementations, in addition to presenting items identified on a predicted items list, supplementary items may be included on a presented inventory holder for presentation to the user. Supplementary items may include, for example, items that are often bought with items on the predicted items list, promotional items, advertised items, free sample items, etc. The user may pick a predicted item and/or a supplementary item.

In some implementations, the inventory management system may monitor the materials handling facility and detect the arrival of a user. For example, if the inventory management system knows the identity of the user, the license plate of the user's car, or other identifying information, it may detect when the user has arrived at the materials handling facility. In other implementations, the user may be identified as the user enters the materials handling facility. For example, one or more images of the user may be captured and processed using facial recognition to identify the user. Alternatively, or in addition thereto, the user may provide identifying information, such as a user name, badge, identifier, biometric information, etc.

Upon detecting the arrival, the inventory management system may initiate the consolidation and presentation of predicted items at a presentation area. Consolidation may be initiated by the inventory management system generating and/or issuing instructions to one or more shuttles to retrieve inventory holders containing the predicted items and to position those inventory holders at presentation locations within a determined presentation area. Likewise, if a presentation location already includes an inventory holder, the inventory management system may send instructions to remove the currently positioned inventory holder so that the inventory holder containing the predicted items can be positioned for presentation to the user.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

Figure 2:
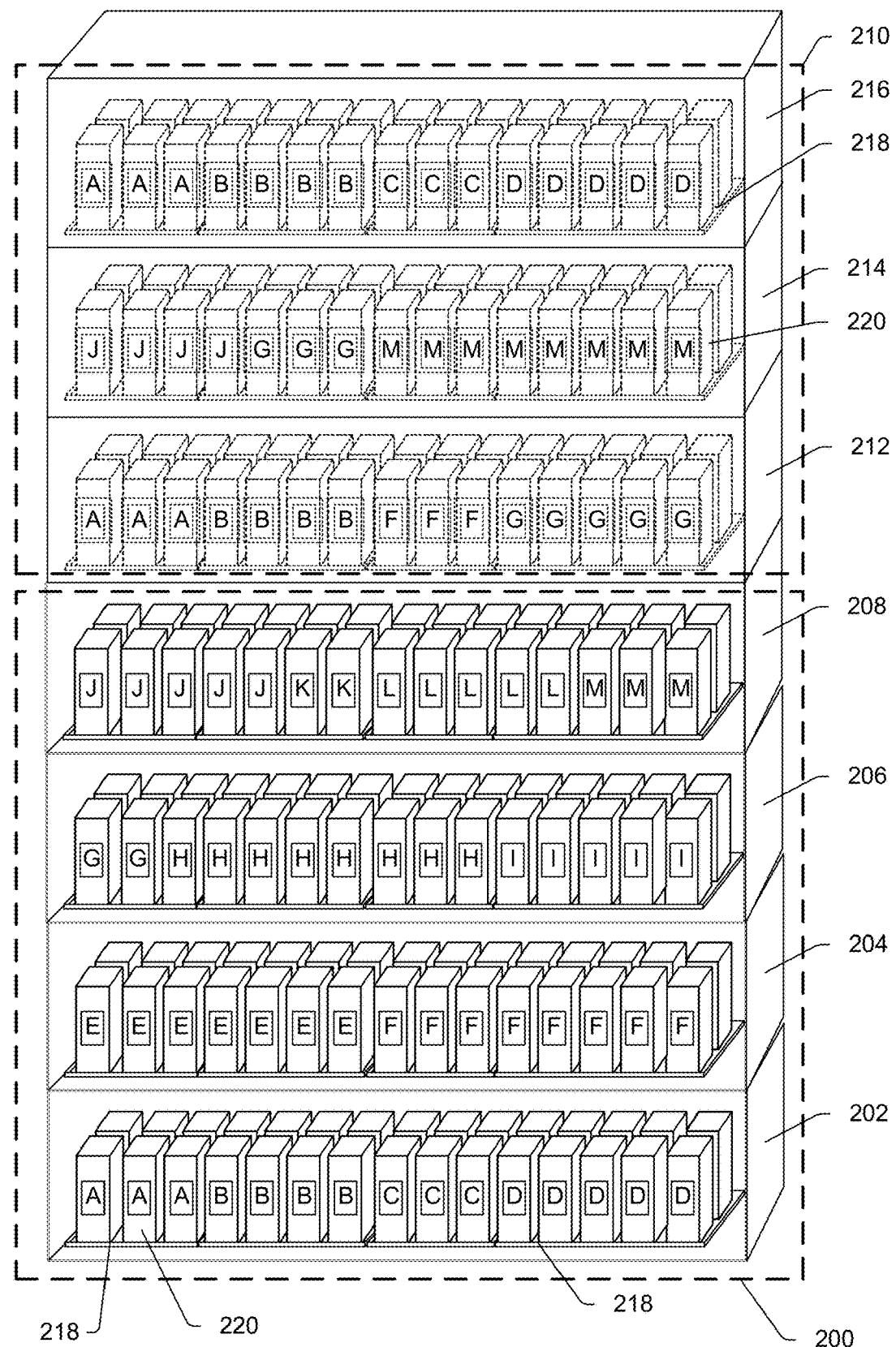
FIG. 2 is a block diagram illustrating additional details of a materials handling facility, according to some implementations.

An implementation of a materials handling facility configured to fulfill items selected by a user is illustrated in FIG. 1. As shown, a materials handling facility 100 includes a receiving area 120, a storage area 130 configured to store an arbitrary number of inventory items 135A-135N, and one or more buffer areas 140 configured to temporarily hold items picked for delivery to a user. The materials handling facility may also include a presentation area 160 (described in further detail below). The arrangement of the various areas within materials handling facility 100 is depicted functionally rather than schematically. For example, in some implementations, multiple different receiving areas 120, storage areas 130, buffer areas 140, and/or presentation areas 160 may be interspersed rather than segregated. Likewise, one or more of the areas may be combined. For example, as illustrated in FIG. 2, the presentation area 160 and the storage area 130 may be combined into a single area.

Additionally, the materials handling facility 100 includes an inventory management system 150 configured to interact with each of receiving area 120, storage area 130, buffer area 140, presentation area 160 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be placed on inventory holders and stored within storage area 130. In some implementations, like items 135 may be stored together in bins, on shelves or via other suitable storage mechanisms, such that all items 135 of a given kind are stored in one storage location or inventory holder within the storage area 130. In other implementations, like items 135 may be stored in different locations and/or multiple locations. For example, to optimize retrieval of certain items 135 having high turnover within a large physical facility, those items 135 may be stored in several different storage locations to reduce congestion that might occur at a single point of storage. In some implementations, some items may also be stored and accessible for retrieval by a user within the presentation area 160. In general, the inventory management system 150 may maintain a mapping or location information identifying where within the materials handling facility each item is stored. Each inventory item may be associated with the corresponding location in which it is stored and the association may be maintained in an inventory data store 915 (FIG. 9) accessible by the inventory management system 150.

When items on a predicted items list are to be retrieved and presented to a user for selection, an inventory holder that contains one or more of the predicted items may be "picked" from storage locations within the storage area 130. For example, in one implementation, a shuttle, such as a shuttle available from Opex Shuttles, Inc., may receive instructions to pick an inventory holder from the storage area 130 and deliver the inventory holder to a presentation area 160.

As discussed in more detail below, a user may select items while in the materials handling facility 100, be presented predicted items determined to likely be of interest to the user, and/or pre-order or confirm items identified on the predicted items list and/or remove an item from the predicted items list. In some instances, predicted items may be determined based on past purchases or picks by the user. For example, if a user picks paper towels every time they are at the materials handling facility, that recurring behavior may be detected and paper towels may be added to the predicted items list. The next time the user arrives at the materials handling facility, an inventory holder that includes paper towels may automatically be presented to the user for selection.

While in the materials handling facility, the user may participate in a selection process, selecting one or more items that the user desires to remove from the materials handling facility. For example, the user may be selecting items for purchase, rental, and/or to borrow that the user desires to take with them when they leave the materials handling facility. As the user selects the items, an identifier associated with the items may be added to an item identifier list associated with the user.

FIG. 2 is a block diagram illustrating additional details of a materials handling facility, according to some implementations. Illustrated in FIG. 2 is a front view of a presentation area 200 and an adjacent storage area 210. In this example, the presentation area is a bin with four shelves 202, 204, 206, 208. As shown, each shelf 202-208 is configured to hold multiple inventory holders 218 at respective presentation locations, and each inventory holder 218 is configured to hold multiple items 220 of inventory. The inventory holder may be any configuration that is capable of holding and/or presenting items. For example, as illustrated in FIG. 2, the inventory holder 218 is a flat tray with small upward extending edges to aid in holding the inventory on the tray as it is moved and/or presented. In other implementations, the inventory holder 218 may have other configurations. For example, the inventory holder may have recesses or slots into which inventory is placed for presentation and to secure the inventory during movement. In still other implementations, the inventory holder may be a completely flat tray, may be a container or tote with sides, etc. Likewise, the inventory holder may be formed of any type of material of sufficient strength to hold inventory and be transported. For example, the inventory holder may be formed from plastic, steel, rubber, polymer, any combination thereof, and/or of other material(s).

In this example, the items on shelves 202-208 are presented to a user for selection and a user may pick one or more items 220 from the presentation area 200. Each presentation location may be configured with one or more conveyers, rollers, guides, or other mechanism to receive and/or provide inventory holders. For example, one or more shuttles (not shown) may operate behind the presentation area 200 to deliver and/or retrieve inventory holders 218 from the presentation locations. In one implementation, a shuttle may position behind a presentation location, retrieve an inventory holder from the presentation location and/or position a different inventory holder at the presentation location. In one configuration, the shuttle may include a conveyor belt that when activated and rotated in a first direction causes the inventory holder to expel from the shuttle and move onto the presentation location. In a similar fashion, when the conveyor is activated in the second direction it may engage with and remove the inventory holder from the presentation location.

In some implementations, the presentation locations may also include a removable barrier to allow access to the inventory presented at the presentation location. For example, when an inventory holder is being placed at and/or removed from a presentation location, the barrier may be raised, thereby preventing access to the inventory, the inventory holder and/or the presentation location while the inventory holder is being positioned. When an inventory holder has been positioned at the presentation location, the barrier may be removed to enable user access to the inventory located on the inventory holder.

Returning to FIG. 2, the storage area 210, in this example, is positioned vertically above the presentation area 200. The storage area may include any number of shelves, such as shelves 212, 214, 216, each shelf may include any number of storage locations and each storage location may store one or more inventory holders 218 that contain one or more items 220 of inventory. In one implementation, as illustrated by the dashed lines, the inventory located in the storage area 210 may not be accessible and/or viewable by users.

As discussed further below, inventory stored in storage area 210 may be retrieved by shuttles (not shown), transitioned to a presentation area and presented to a user for selection. In some implementations, items 220 of inventory may be stored in storage areas adjacent to the presentation area where the item is typically presented for user selection. In other implementations, inventory may be randomly stored in different storage areas 210. In still other implementations, items that are picked more frequently by users (a.k.a., high velocity items) may be stored at storage areas that are central to the facility so that the items can be picked and delivered quickly to different presentation areas within the facility.

While the example block diagram illustrated in FIG. 2 shows a presentation area with four shelves 202-208 and an adjacent storage area 210 that is positioned above the presentation area 200 that includes three shelves 212-216, in other implementations other configurations may be utilized. For example, the presentation area 200 may include additional or fewer shelves, and the shelves may include additional or fewer presentation locations. Likewise, the storage area 210 may include additional or fewer shelves for storing items. In some implementations, the storage area may be positioned above, behind and/or below the presentation area.

Figure 3:
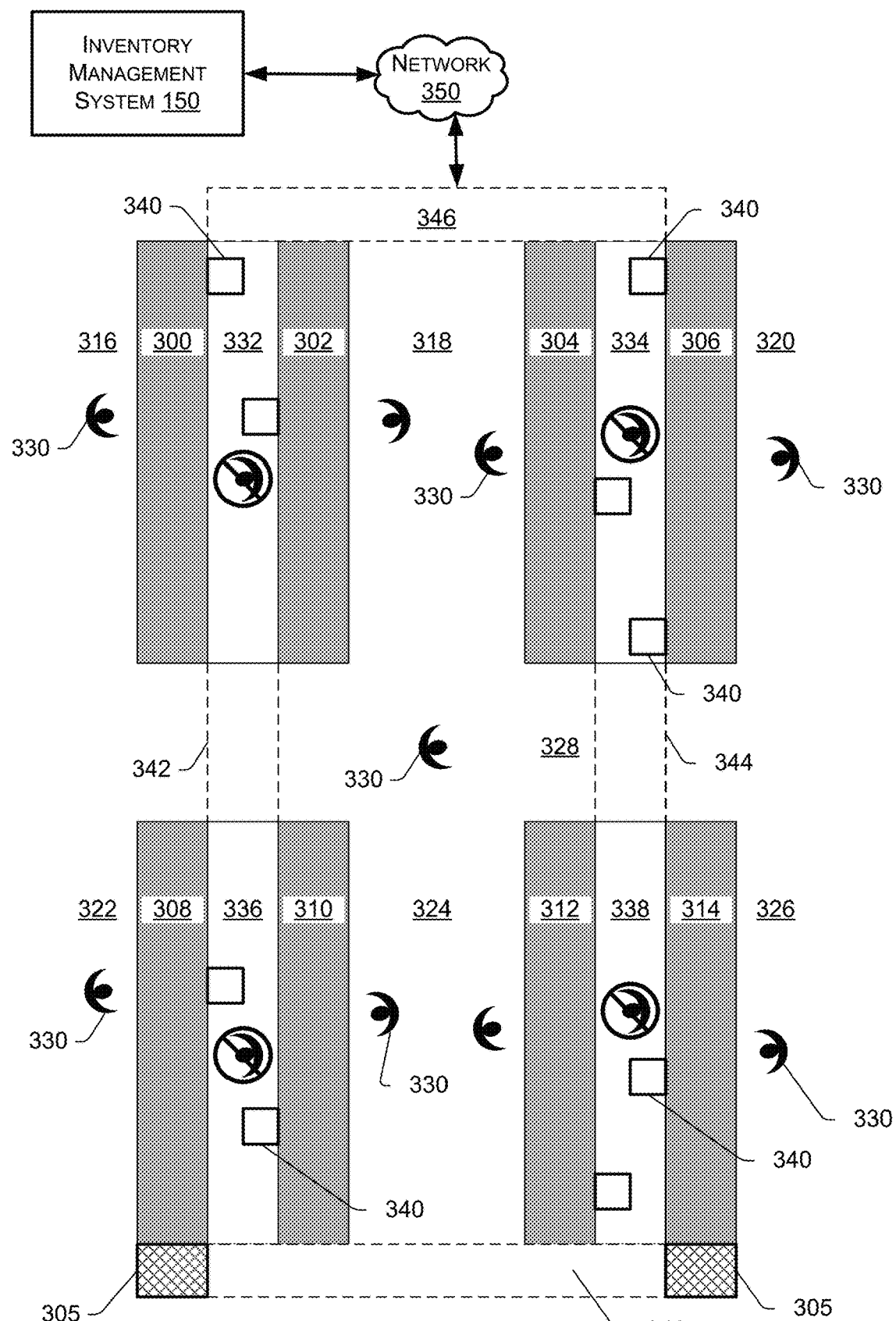
FIG. 3 is a block diagram illustrating an overhead view of a materials handling facility, according to some implementations.

FIG. 3 is a block diagram illustrating an overhead or top-down view of a materials handling facility, according to some implementations. As illustrated, there are eight presentation areas 300, 302, 304, 306, 308, 310, 312, 314. As discussed above, the presentation areas may also include adjacent (e.g., above, below, behind) storage areas. In this example, the storage areas are above and/or below the presentation areas and thus not visible from the top-down view. The presentation areas are positioned to establish aisles 316, 318, 320, 322, 324, 326, 328 where users 330 may move about the materials handling facility picking items from the presentation areas. Likewise, the presentation areas 300-314 are also positioned to establish shuttle areas 332, 334, 336, 338 about which one or more shuttles 340 may move to transition inventory holders to different presentation locations and/or storage locations. In some implementations, the shuttles may move horizontally and/or vertically via a series of rails and/or tracks mounted to the back of the presentation areas and/or storage areas. Likewise, in some implementations, the shuttle areas may be interconnected via overhead connectors 342, 344, 346, 348 to enable movement of the shuttles between different presentation areas and/or storage areas within the materials handling facility.

The inventory management system may communicate with the shuttles 340, the presentation areas 300-314 and/or the respective presentation locations and/or storage locations via a network 350 to provide instructions to the various components for moving items of inventory for storage and/or presentation. For example, the inventory management system 150 may provide instructions to one or more shuttles 340 to retrieve inventory holders from various storage locations, to transition those inventory holders to respective presentation locations within a presentation area, such as presentation area 300, and position the respective inventory holders at the presentation locations for presentation to a user.

In some implementations, there may be one or more additional presentation locations 305. The dedicated presentation location 305, as discussed below with respect to FIG. 4, may be a specific location where a user 330 can retrieve an item that is not presented at a presentation location. For example, a user may request a specific item be retrieved from a storage area. The requested item may be retrieved and presented to the user at the additional presentation location 305 for picking by the user.

Figure 4:
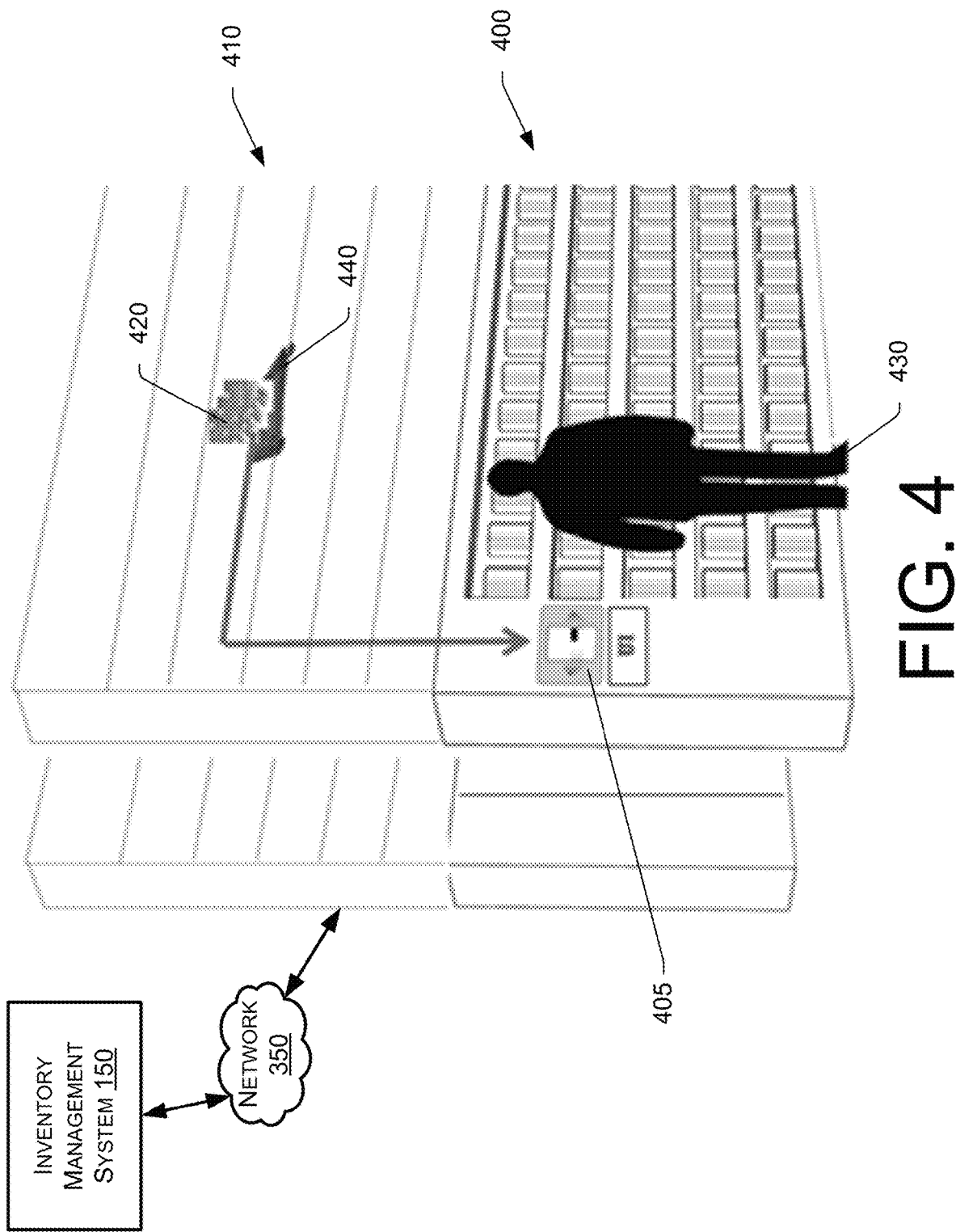
FIG. 4 is a block diagram illustrating additional details of a materials handling facility, according to some implementations.

FIG. 4 is a block diagram illustrating additional details of a materials handling facility, according to some implementations. The example illustrated in FIG. 4 shows a presentation area 400 and adjacent storage area 410. In addition, the presentation area includes an additional presentation location 405 for the delivery and presentation of items specifically requested by the user 430. In this example, the user 430 has requested an item 420 that is not already presented at the presentation area 400. A user request for an item may be provided using, for example, a portable device associated with the user and/or an input component (e.g., touch-based display, microphone) located within the inventory management system.

Rather than requiring that the user move to another area within the materials handling facility to retrieve the item (if it is presented elsewhere), and/or requiring an associate to retrieve the item from storage, upon receiving a request from the user for the item, the inventory management system 150, via the network 350, may send instructions to a shuttle 440 to retrieve an inventory holder that contains the requested item 420 from a storage area and deliver the inventory holder that contains the requested item 420 to the additional presentation location 405. When the shuttle 440 arrives at the additional presentation location 405 with the inventory holder that contains the requested item 420, the requested item may be presented to the user 430 for selection. For example, the additional presentation location 405 may include a movable barrier that, once the shuttle 440 positions the inventory holder at the additional presentation location 405, is removed to provide the user with access to the requested item 420.

In some implementations, rather than or in addition to an additional presentation location, a requested item may be presented to a user using any presentation location. For example, if a user requests a specific item, a currently presented inventory holder containing other items may be removed from presentation and replaced with the inventory holder containing the requested item 420. For example, the size of the inventory holder containing the requested item 420 may be determined and other inventory holders of a similar size that are being presented to the user may be determined. One of the determined inventory holders may then be selected, removed from presentation to the user, and the presentation location utilized to present the inventory holder containing the requested item. The removed inventory holder may be selected based on one or more factors. For example, if the user has already picked an item from the inventory holder, the inventory holder may be removed and replaced with the inventory holder containing the requested item 420.

Figure 5:
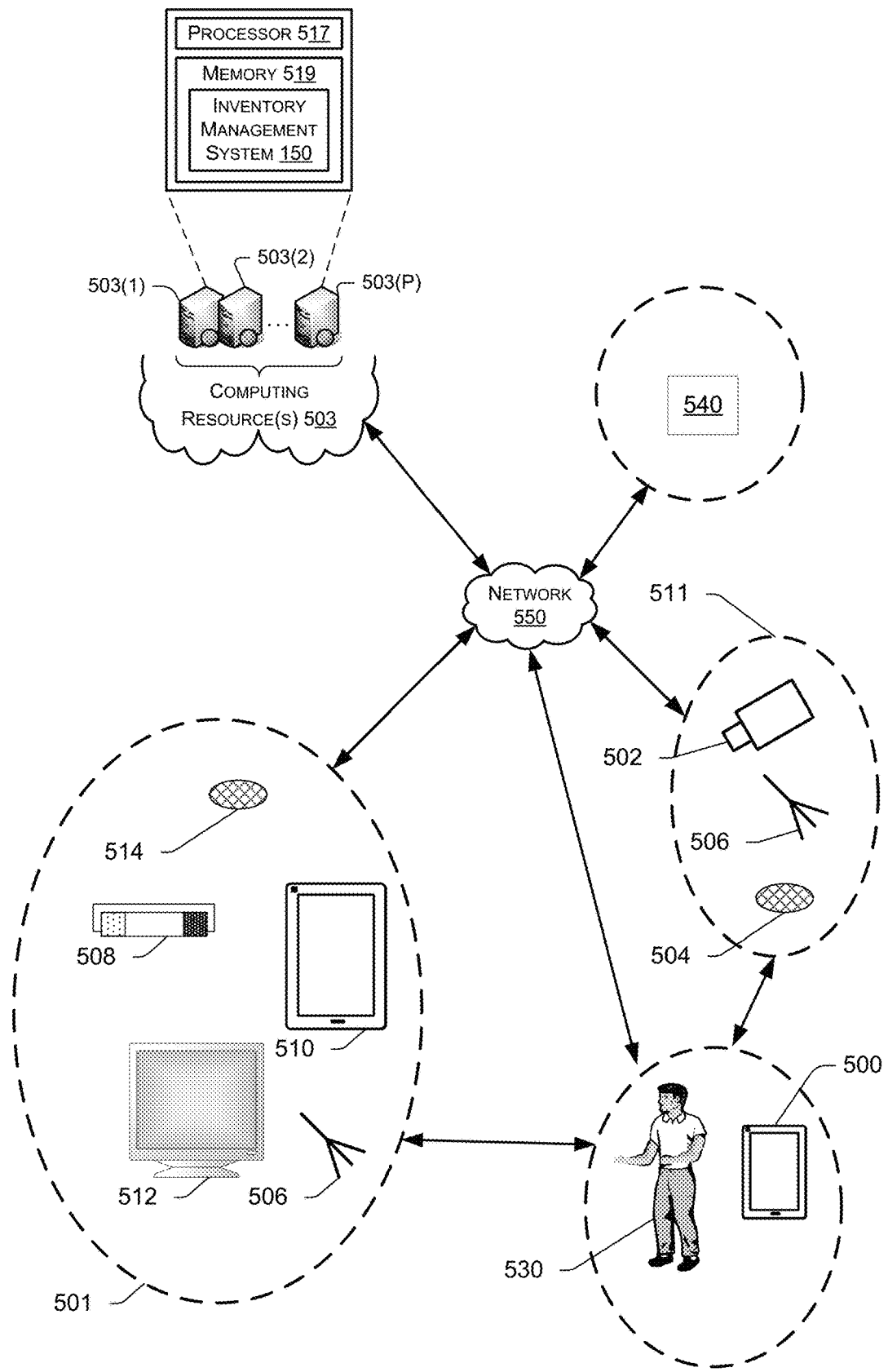
FIG. 5 is a block diagram illustrating components of a materials handling facility, according to some implementations.

FIG. 5 shows additional components and communication paths between component types utilized in a materials handling facility 100 with an inventory management system 150 of FIG. 1, in accordance with some implementations. A portable device 500 associated with the user 530 may communicate and interact with various components over a variety of communication paths. Generally, the inventory management system 150 and/or the materials handling facility may include input components 511, output components 501 and computing resource(s) 503. The input components 511 may include a camera 502, microphone 504, antenna 506, sensor (not shown), scale (not shown), light curtain (not shown), RFID scanner, visual identifier reader, or any other component that is capable of receiving input about the surrounding environment, from the user of the portable device and/or from the portable device. The output components 501 may include a projector 508, a portable device 510, a display 512, an antenna 506, a radio (not shown), speakers 514 and/or any other component that is capable of providing output.

The inventory management system 150 may also include computing resource(s) 503. The computing resource(s) 503 may be local to the environment (e.g., materials handling facility), remote from the environment, or any combination thereof. Likewise, the computing resource(s) 503 may be configured to communicate over a network 550 with input components 511, output components 501, shuttles 540, the portable device 500 and/or the user 530.

As illustrated, the computing resource(s) 503 may be remote from the environment and implemented as one or more servers 503(1), 503(2), . . . , 503(P) and may, in some instances, form a portion of a network-accessible computing platform implemented as a computing infrastructure of processors, storage, software, data access, and so forth that is maintained and accessible by components/devices of the inventory management system 150 via a network 550, such as the Internet. For example, the computing resources 503 may process images to identify a user, determine whether an item has been removed from an inventory holder (or storage location) or placed into an inventory holder (or storage location). Likewise, the computing resources 503 may determine routing paths for shuttles 540 for picking/retrieving inventory holders from storage areas and delivering inventory holders to presentation locations at presentation areas.

Likewise, in some implementations, the inventory management system 150 may communicate via the network 550 with the presentation locations (not shown), sending instructions to display information (e.g., item information) on a display located at the presentation location, engage a conveyor to receive and/or expel an inventory holder, raise/lower a barrier, etc. In some implementations, the presentation locations may also include one or more input components (e.g., cameras, scales, touch-based displays) and, when information is received from one or more of the input components, it may be provided by the presentation location to the inventory management system 150 via the network 550. For example, the presentation location may include one or more scales and/or pressure sensors configured to detect a change in weight resulting from the pick and/or place of an item from an inventory holder positioned at the presentation location. When a change in weight is detected, a notification may be sent to the inventory management system 150. A change in weight may be used to determine if an item has been picked and/or placed at the presentation location.

The computing resource(s) 503 do not require end-user knowledge of the physical location and configuration of the system that delivers the services. Common expressions associated for these remote computing resource(s) 503 include "on-demand computing," "software as a service (SaaS)," "platform computing," "network-accessible platform," "cloud services," "data centers," and so forth.

Each of the servers 503(1)-(P) include a processor 517 and memory 519, which may store or otherwise have access to an inventory management system 150, which may include or provide image processing (e.g., for user identification and/or item identification), inventory tracking, order processing, shuttle routing, and/or location determination.

The network 550 may utilize wired technologies (e.g., wires, USB, fiber optic cable, etc.), wireless technologies (e.g., RF, IR, NFC, cellular, satellite, Bluetooth, etc.), or other connection technologies. The network 550 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some implementations, the inventory management system 150 may be utilized to process images received from multiple material handling facilities. For example, the remote computing resources 503 may communicate over the network 550 with multiple material handling facilities to control picking and/or storage of items and to provide instructions to shuttles 540, presentation locations, storage locations and/or users 530.

Figure 6:
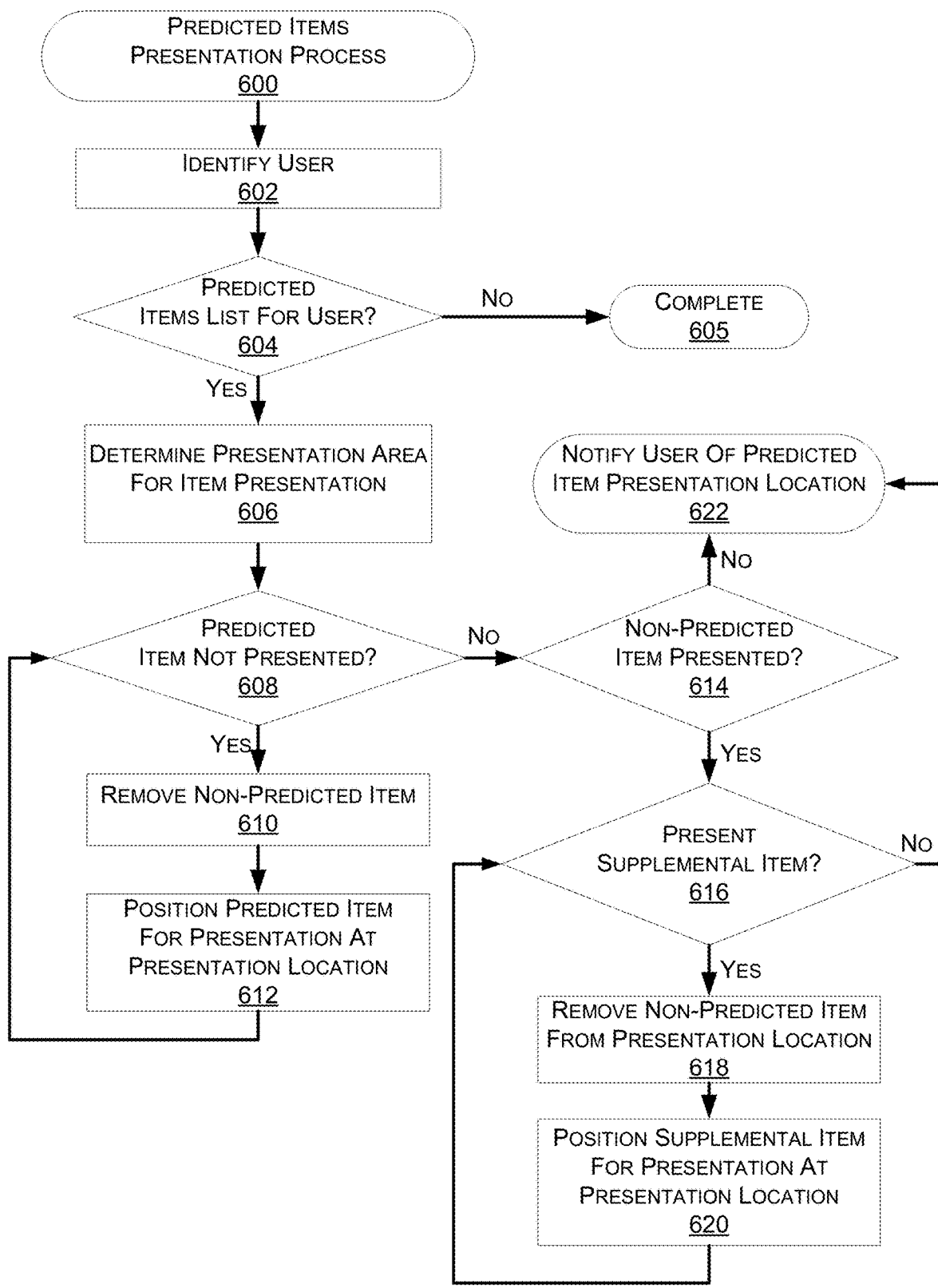
FIG. 6 is a flow diagram of an example predicted items presentation process, according to some implementations.

FIG. 6 depicts a flow diagram of an example predicted items presentation process 600, according to some implementations. The process of FIG. 6, and each of the other processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by identifying a user, as in 602. User identification may be done using a variety of techniques. For example, the user may be identified using facial recognition, based on an identifier provided by the user, based on an identifier carried by the user, and/or any combination thereof. In some implementations, the user may be identified as they near the materials handling facility. For example, the user may provide the inventory management system with an identification of the automobile (e.g., license plate), or the user may be assigned an identifier that is detected as they approach the materials handling facility.

Upon user identification, a determination is made as to whether a predicted items list for the user exists, as in 604. In some implementations, the inventory management system may maintain a user account for each user. Each time a user interacts with the materials handling facility, such as picking items, ordering items, purchasing items, etc., the inventory management system maintains information about those interactions. Based on the user's actions and/or other information, a determination can be made as to what items are likely of interest to the user (predicted items). Other information includes, for example, items already picked by the user, items that go well with items picked by the user, items picked by other users determined to have similar picking habits to the picking habits of the user, etc. For example, if the user purchases the same five items each time they arrive at the materials handling facility, it can be determined with a high probability that the user will pick those five items during their next trip to the materials handling facility. A predicted items list for a user may be generated at any time. For example, a predicted items list for a future trip by the user to the materials handling facility may be generated as they are completing a current trip to the materials handling facility. The predicted items list may then be provided to the user for review, modification and/or confirmation at a time prior to their next trip to the materials handling facility. Likewise, the predicted items list may be updated based on, for example, a time since the user last visited the materials handling facility.

If it is determined that a predicted items list does not exist for the user, the example process completes, as in 605. However, if it is determined that a predicted items list does exist for the user, a presentation area for presentation of predicted items is determined, as in 606. A presentation area may be any location within the materials handling facility that is available and of a size sufficient to receive inventory holders containing the predicted items. In some implementations, the size of the inventory holders that contain the predicted items may be determined and presentation areas of sufficient size for presenting the inventory holders of predicted items is determined. A presentation area may be considered available if none of the presentation locations are currently being used to present predicted items to another user.

While the examples discussed herein describe a presentation area as a group of adjacent presentation locations that are used for presenting predicted items to a single user, in other implementations, a presentation area may not consist of all adjacent presentation locations. For example, two or more presentation areas, each used for presenting predicted items to different users, may be intertwined such that some of the presentation locations on an aisle correspond to one presentation area and other presentation locations on the aisle correspond to a second presentation area. In other implementations, multiple presentation areas may utilize one or more of the same presentation locations. For example, if two users have one or more predicted items that are the same, the inventory holder containing the common predicted items may be presented at a presentation location that is associated with each presentation area.

If there are multiple available presentation areas that are available and of a sufficient size, other factors may be considered in determining a presentation area. For example, the number of predicted items already presented at the presentation area, the total distance that inventory holders will have to be moved from storage areas (or other areas) to present each of the predicted items to the user, the location of the user within the materials handling facility, etc., may be considered in selecting a presentation area for presenting the predicted items to the user.

After selecting a presentation area, a determination is made as to whether a predicted item is not presented at the presentation area, as in 608. If it is determined that a predicted item is not presented at the presentation location, instructions are sent to remove an inventory holder containing a non-predicted item from a presentation location, as in 610. The instructions may be sent to a nearby shuttle instructing the shuttle to move to the presentation location, remove the inventory holder from the presentation location and transition the inventory holder to another location (e.g., a storage location, another presentation location).

The example process 600 also causes the predicted item to be positioned at the presentation location, as in 612. For example, instructions may be sent to a nearby shuttle instructing the shuttle to retrieve an inventory holder (e.g., from a storage location or another presentation location) containing the predicted item and transition the inventory holder to the presentation location. The instructions may also include instructions to move the inventory holder from the shuttle to the presentation location.

After causing the predicted item to be positioned at the presentation location, the example process 600 returns to decision block 608 and continues. If it is determined at decision block 608 that all predicted items are presented at the presentation area, a determination is made as to whether any non-predicted items are still presented at the presentation area, as in 614. If non-predicted items remain, a determination is made as to whether any supplementary items are to be presented to the user, as in 616. Supplementary items may be, for example, promotional items, free samples, items often purchased with the predicted items, items associated with a coupon maintained by the user, discounted items, etc. If it is determined that a supplementary item is to be presented, instructions are sent to remove an inventory holder containing a non-predicted item from a presentation location, as in 618. The instructions may be sent to a nearby shuttle instructing the shuttle to move to the presentation location, remove the inventory holder from the presentation location and transition the inventory holder to another location (e.g., a storage location, another presentation location).

The example process 600 also causes the supplementary item to be positioned at the presentation location, as in 620. For example, instructions may be sent to a nearby shuttle instructing the shuttle to retrieve an inventory holder (e.g., from a storage location or another presentation location) containing a supplementary item and transition the inventory holder to the presentation location. The instructions may also include instructions to move the inventory holder from the shuttle to the presentation location.

After positioning a supplemental item at a presentation location within the presentation area, the example process 600 returns to block 616 and continues, determining if other supplemental items are to be presented. If it is determined that no supplemental items are to be presented, or if it is determined that no non-predicted items are presented at the inventory area, the example process 600 notifies the user that predicted items are presented at the presentation location for browsing and selection by the user, as in 622. The notification may be sent to the user by presenting the notification on an output device (e.g., display, projector, speaker, portable device) within visual and/or audible range of the user. The notification may also identify the location of the presentation area, guidance information to assist in routing the user to the presentation area, an identification of predicted items, etc.

Figure 7:
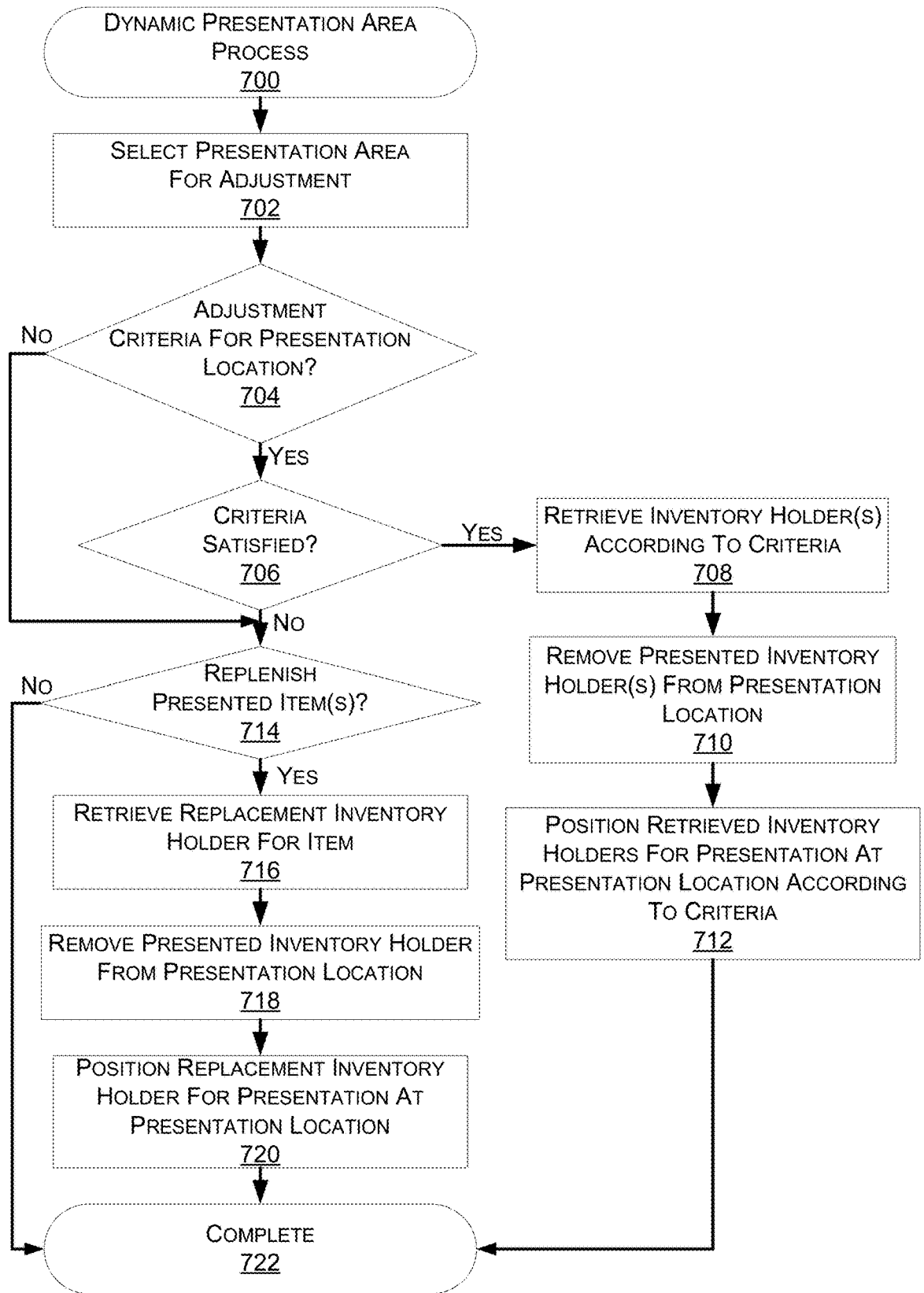
FIG. 7 is a flow diagram of an example dynamic presentation area process, according to some implementations.

FIG. 7 is a flow diagram of an example dynamic presentation area process 700, according to some implementations. The example process 700 begins by selecting a presentation area for dynamic adjustment, as in 702. In some implementations, any presentation area within the materials handling facility may be dynamically adjusted. Likewise, as discussed above, the presentation area may include one or more presentation locations.

Upon selecting a presentation area, a determination is made as to whether adjustment criteria exist that are associated with the presentation area, as in 704. Adjustment criteria may be maintained by the inventory management system 150 and periodically applied to determine if the presentation area is to be adjusted. Adjustment criteria may be any factor or factors (e.g., business rule) that when satisfied cause the presentation area to be adjusted. For example, adjustment criteria may consider the time of day, the day of the week, seasons, holidays, weather, users in the materials handling facility, locations of user(s) in the materials handling facility, agreements with vendors, manufacturers, sellers, etc. For example, a vendor (Vendor 1) may have an agreement with the materials handling facility that Vendor 1 provided items are to be positioned in the front of the materials handling facility when the average age of the users located in the materials handling facility is between 30 years old and 50 years old.

If it is determined that that adjustment criteria exist for the selected presentation area, a determination is made as to whether the adjustment criteria have been satisfied, as in 706. If the adjustment criteria have been satisfied, the inventory holders to be presented at the presentation area according to the adjustment criteria are retrieved from the storage area and/or another presentation area, as in 708. Continuing with the above example, if it is determined that the adjustment criteria are satisfied such that Vendor 1 items are to be presented at a presentation area in the front of the materials handling facility, inventory holders containing the items to be presented are located and retrieved by a shuttle(s). In some implementations, the adjustment criteria may identify the specific items to be presented, a group of items to be presented, a presentation arrangement, a group of items from which presented items may be selected, etc.

In addition to retrieving the items to be presented, the inventory holders currently positioned at the presentation area are removed, as in 710. For example, instructions may be sent to remove an inventory holder from a presentation location within the presentation area. The instructions may be sent to a nearby shuttle instructing the shuttle to move to the presentation location, remove the inventory holder from the presentation location and transition the inventory holder to another location (e.g., a storage location, another presentation location).

The example process 700 also causes the retrieved inventory holder to be positioned at the presentation location, as in 712. For example, instructions may be sent to the shuttle that retrieved the inventory holder containing the inventory to be presented (e.g., from a storage location or another presentation location) to transition the retrieved inventory holder to the presentation location. The instructions may also include instructions to move the inventory holder from the shuttle to the presentation location.

However, if it is determined at decision block 706 that the adjustment criteria has not been satisfied, or if it is determined that there is no adjustment criteria associated with the selected presentation location, a determination is made as to whether any currently presented items are to be replenished, as in 714. An item or group of items may be replenished if, for example, a determined percentage of the items (e.g., 30%) have been picked from the presentation location, if one or more of the items has, or will soon, expire, etc. For example, if 30% of item A has been picked from an inventory holder positioned at the presentation area, it may be determined that the item is to be replenished.

If it is determined that an item is to be replenished, a replacement inventory holder containing the item is identified and retrieved from storage, as in 716. For example, instructions may be sent to a shuttle to retrieve from a storage area the replacement inventory holder that contains the item.

In addition to retrieving a replacement inventory holder, the inventory holder to be replaced that is currently positioned at the presentation area is removed, as in 718. For example, instructions may be sent to remove an inventory holder from a presentation location within the presentation area. The instructions may be sent to a nearby shuttle instructing the shuttle to move to the presentation location, remove the inventory holder from the presentation location and transition the inventory holder to another location (e.g., a storage location, another presentation location, a replenishment area).

The example process 700 also causes the retrieved replacement inventory holder to be positioned at the presentation location, as in 720. For example, instructions may be sent to the shuttle that retrieved the replacement inventory holder containing the inventory to be presented (e.g., from a storage location or another presentation location) to transition the retrieved inventory holder to the presentation location. The instructions may also include instructions to move the inventory holder from the shuttle to the presentation location.

After positioning retrieved inventory holders at a presentation area according to adjustment criteria, positioning a replacement inventory holder at a presentation area, or if it is determined that there are no items to be replenished, the example process 700 completes, as in 722. In some implementations, a replacement inventory holder may be used to replace a depleted and/or expiring item with a same item type, or replace a depleted and/or expiring item with a different item type.

Figure 8:
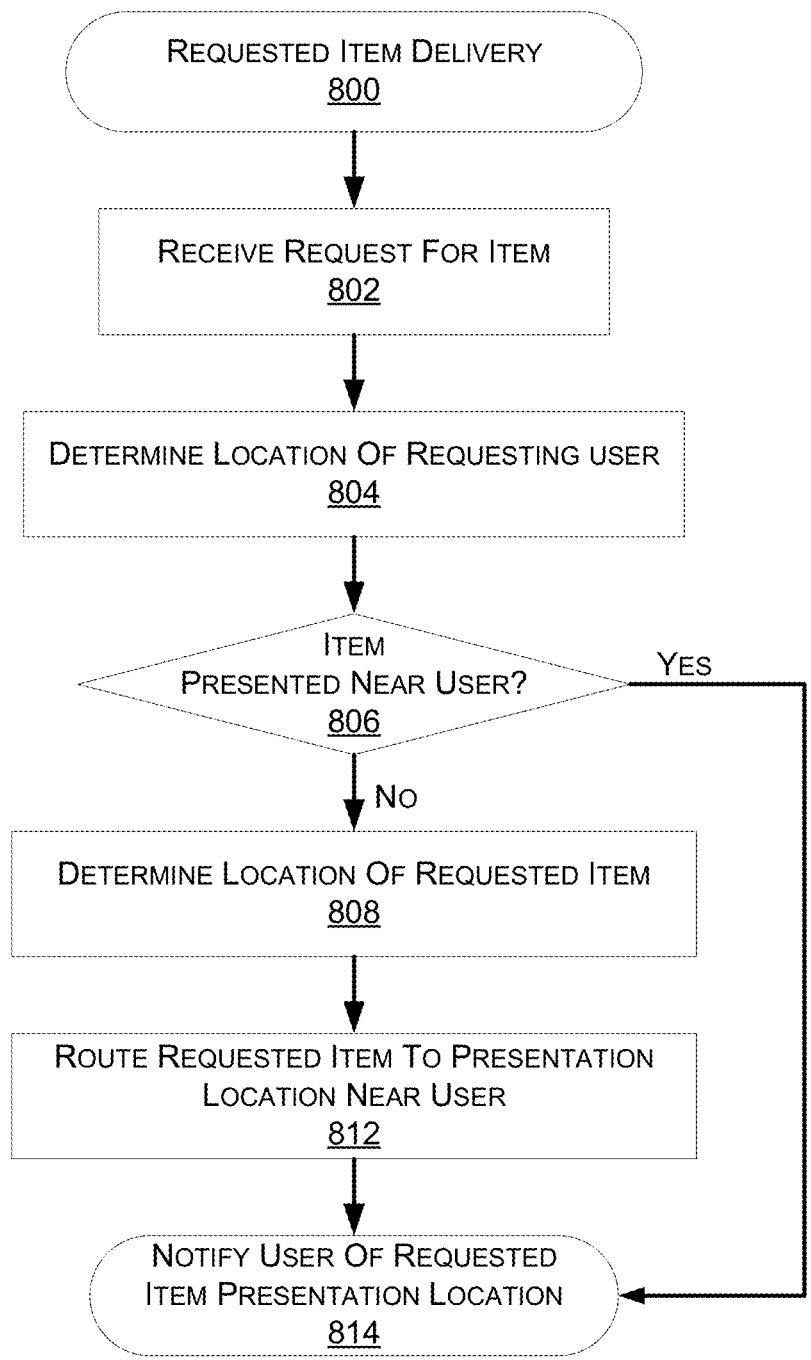
FIG. 8 is a flow diagram of an example requested item delivery process, according to some implementations.

FIG. 8 is a flow diagram of an example requested item delivery process 800, according to some implementations. The example process begins by receiving a request for an item, as in 802. A user may submit a request by using the portable device and/or an input component located within the materials handling facility. For example, each presentation location may include a touch-based display. The user can interact with the touch based display and request, among other things, delivery of a particular item.

When a user request for an item is received, the example process 800 determines the location of the user within the materials handling facility, as in 804. The location of the user may be determined using, for example, image processing to identify the location of the user. Alternatively, or in addition thereto, if the user interacts with an input device of the materials handling facility, the user's location may be determined based on the location of the input device utilized by the user.

Based on the determined location of the user, a determination is made as to whether the requested item is currently presented near the user, as in 806. For example, if the requested item is currently located at a presentation location within a defined distance (e.g., 15 feet) from the user, it may be determined that the requested item is currently presented near the user.

If it is determined that the requested item is not currently presented near the user, a location of the requested item is determined, as in 808. A requested item may be located at a storage location and/or at another presentation location that is not near the user. Instructions may then be sent to a shuttle to retrieve the requested item and route the requested item to a presentation location that is near the user, as in 812. The presentation location near the user may be any presentation location within a defined distance of the user. In some implementations, the presentation location may be a dedicated presentation location that is utilized only for the presentation of requested items. For example, a dedicated presentation location may be positioned at the end of each aisle and used to present requested items that are retrieved from other areas within the materials handling facility.

After routing the requested item to a presentation location that is near the user or after determining that the item is already presented at a presentation location that is near the user, the example process 800 may provide a notification to the user that the requested item is available for selection, as in 814. The notification may identify the location of the presentation location and/or provide guidance to route the user to the presentation location of the requested item. The notification may be provided to the user via any output device (e.g., portable device, projector, display, speaker) that is within visual and/or audible range of the user.

Figure 9:
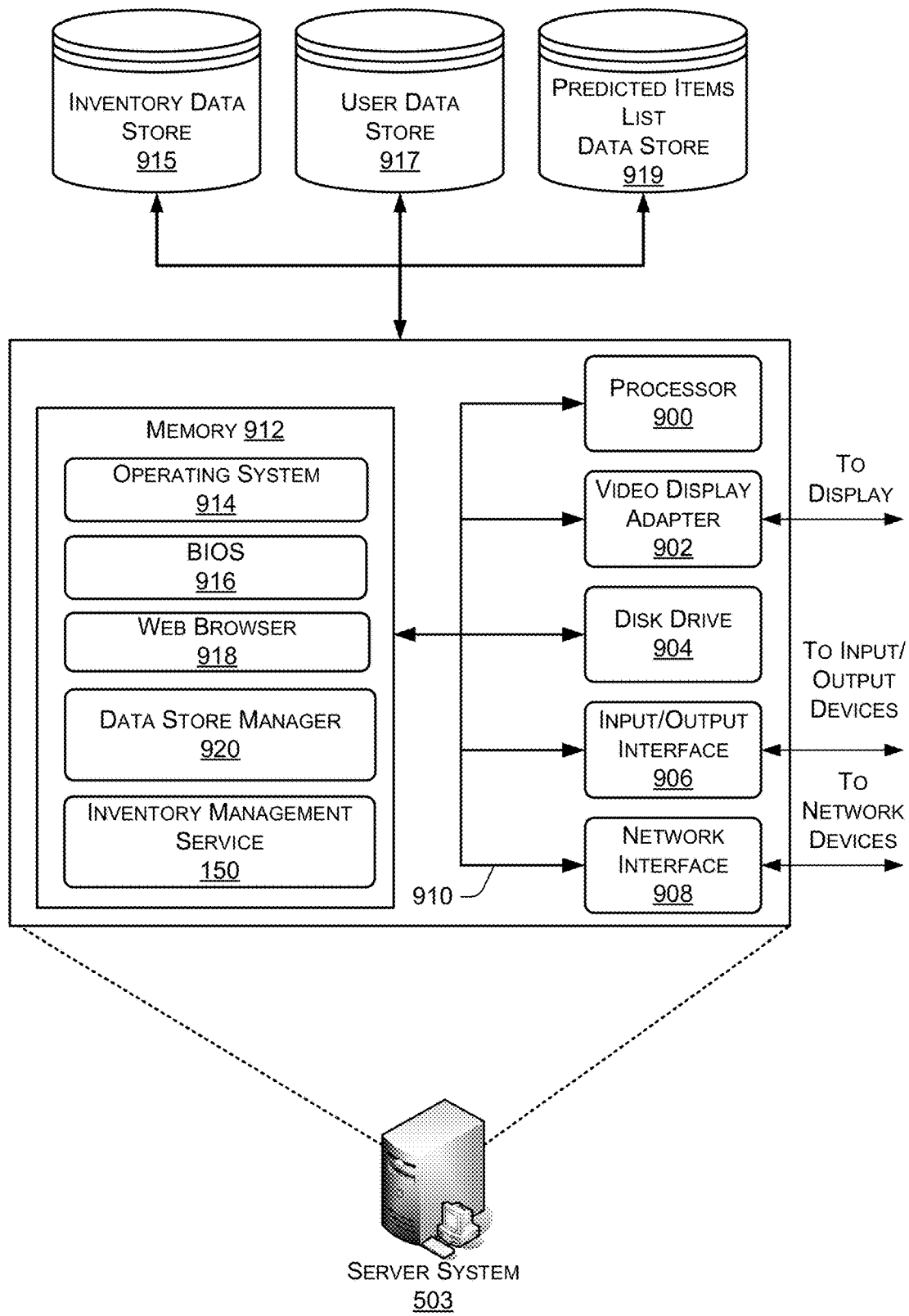
FIG. 9 is a block diagram of an illustrative implementation of a server system that may be used with various implementations, such as the remote computing resources.

FIG. 9 is a pictorial diagram of an illustrative implementation of a server system, such as the remote computing resource 503 (FIG. 5), that may be used in the implementations described herein. The remote computing resource 503 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the remote computing resource 503 to monitor and configure operation of the remote computing resource 503. The input/output interface 906 likewise communicates with external input/output devices not shown in FIG. 9, such as a mouse, keyboard, scanner, or other input and output devices that can be operated by an operator of the remote computing resource 503. The network interface 908 includes hardware, software, or any combination thereof, to communicate with other computing devices. For example, the network interface 908 may be configured to provide communications between the remote computing resource 503 and other computing devices via the network 550, as shown in FIG. 5.

The memory 912 generally comprises random access memory (RAM), read-only memory (ROM), flash memory, and/or other volatile or permanent memory. The memory 912 is shown storing an operating system 914 for controlling the operation of the remote computing resource 503. A binary input/output system (BIOS) 916 for controlling the low-level operation of the remote computing resource 503 is also stored in the memory 912.

The memory 912 additionally stores program code and data for providing network services that allow the inventory management system 150 to track items removed from inventory holders, generate predicted items lists, and/or to present predicted items to users. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the inventory data store 915, the user data store 917 and/or the predicted items list data store 919.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 503 can include any appropriate hardware and software for integrating with the data stores 915, 917, 919 as needed to execute aspects of the inventory management system 150.

The data stores 915, 917, 919 can include several separate data tables, databases or other data storage mechanisms and media for storing data relating to a particular aspect. For example, the data stores 915, 917, 919 illustrated include mechanisms for inventory information, user information, etc., which can be used to identify an item removed from a storage location, placed into a storage location, removed from a presentation location and/or placed into a presentation location.

It should be understood that there can be many other aspects that may be stored in the data stores 915, 917, 919. The data stores 915, 917, 919 are operable, through logic associated therewith, to receive instructions from the remote computing resource 503 and obtain, update or otherwise process data in response thereto.

The memory 912 may also include the inventory management system 150, discussed above. The inventory management system 150 may be executable by the processor 900 to implement one or more of the functions of the remote computing resource 503. In one implementation, the inventory management system 150 may represent instructions embodied in one or more software programs stored in the memory 912. In another implementation, the inventory management system 150 can represent hardware, software instructions, or a combination thereof.

The remote computing resource 503, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with executable instructions,
selecting a presentation area located within a materials handling facility, wherein:
the presentation area is configured to hold one or more inventory holders of a plurality of inventory holders such that any item included on the one or more inventory holders may be selected from the inventory holder by a user;
at least some of the plurality of inventory holders are able to hold a plurality of items; and
items positioned on an inventory holder of the plurality of inventory holders are removable from the inventory holder while the inventory holder is positioned at the presentation area;
determining that an adjustment criteria associated with the presentation area is satisfied;
determining a first inventory holder of the plurality of inventory holders that includes at least a first item to be presented at the presentation area in accordance with the adjustment criteria;
removing a second inventory holder that includes at least a second item from the presentation area; and
positioning the first inventory holder at the presentation area such that the first item is presented and available to be selected from the first inventory holder by the user.

2. The computer-implemented method of claim 1, further comprising:
sending an instruction to a shuttle to retrieve the first inventory holder from a storage area.

3. The computer-implemented method of claim 1, wherein the adjustment criteria is at least one of: a time of a day, a day of a week, a season, a holiday, a weather, a user located in the materials handling facility, an agreement with a vendor of an item located in the materials handling facility, an agreement with a manufacturer of an item located in the materials handling facility, or an agreement with a seller of an item located in the materials handling facility.

4. The computer-implemented method of claim 1, further comprising:
   determining that a third item located at the presentation area is to be replenished;
   removing a third inventory holder of the plurality of inventory holders from the presentation area that contains the third item to be replenished; and
   positioning a fourth inventory holder at the presentation area.

5. The computer-implemented method of claim 4, wherein the third item is determined to be replenished if a defined percentage of the third item has been picked from the presentation area.

6. The computer-implemented method of claim 1, wherein:
   the presentation area includes a plurality of presentation locations; and
   for each presentation location:
      at least one inventory holder of the plurality of inventory holders is removed from the presentation location; and
      at least one other inventory holder of the plurality of inventory holders is positioned at the presentation location according to the adjustment criteria.

7. A system, comprising:
   one or more processors; and
   a memory storing program instructions that when executed by the one or more processors cause the one or more processors to at least:
      select a presentation area located within a materials handling facility, wherein:
         the presentation area is configured to hold one or more inventory holders of a plurality of inventory holders such that any item included on the one or more inventory holders may be selected from the inventory holder by a user:
         at least some of the plurality of inventory holders are able to hold a plurality of items; and
         items positioned on an inventory holder of the plurality of inventory holders are removable from the inventory holder while the inventory holder is positioned at the presentation area;
      determine that an adjustment criteria associated with the presentation area is satisfied;
      determine a first inventory holder of the plurality of inventory holders to be presented at the presentation area in accordance with the adjustment criteria;
      remove a second inventory holder of the plurality of inventory holders from the presentation area; and
      position the first inventory holder at the presentation area such that one or more items are presented and available to be selected from the first inventory holder by the user.

8. The system of claim 7, wherein the program instructions that when executed by the one or more processors further cause the one or more processors to at least:
   send an instruction to a shuttle to retrieve the first inventory holder from a storage area.

9. The system of claim 7, wherein the adjustment criteria is at least one of: a time of a day, a day of a week, a season, a holiday, a weather, a user located in the materials handling facility, an agreement with a vendor of an item located in the materials handling facility, an agreement with a manufacturer of an item located in the materials handling facility, or an agreement with a seller of an item located in the materials handling facility.

10. The system of claim 7, wherein the program instructions that when executed by the one or more processors further cause the one or more processors to at least:
   determine that an item located at the presentation area is to be replenished;
   remove a third inventory holder from the presentation area that contains the item to be replenished; and
   position a fourth inventory holder at the presentation area.

11. The system of claim 10, wherein the item is determined to be replenished if a defined percentage of the item has been picked from the presentation area.

12. The system of claim 7, wherein:
   the presentation area includes a plurality of presentation locations; and
   for each presentation location:
      at least one inventory holder of the plurality of inventory holders is removed from the presentation location; and
      at least one other inventory holder of the plurality of inventory holders is positioned at the presentation location according to the adjustment criteria.

13. The system of claim 7, wherein the program instructions that when executed by the one or more processors further cause the one or more processors to at least:
   determine that a user has picked an item from the first inventory holder; and
   add an item identifier representative of the item to an item identifier list associated with the user.

14. The system of claim 7, wherein the program instructions that when executed by the one or more processors further cause the one or more processors to at least:
   send a first instruction to a first shuttle to retrieve the first inventory holder from a storage area; and
   send a second instruction to a second shuttle to remove the second inventory holder.

15. A method, comprising:
   selecting a presentation area located within a materials handling facility, wherein:
      the presentation area is configured to hold one or more inventory holders of a plurality of inventory holders such that any item included on the one or more inventory holders may be selected from the inventory holder by a user; and
      at least some of the plurality of inventory holders are able to hold a plurality of items; and
      items positioned on an inventory holder of the plurality of inventory holders are removable from the inventory holder while the inventory holder is positioned at the presentation area;
   determining a first inventory holder to be presented at the presentation area in accordance with an adjustment criteria;
   removing a second inventory holder from the presentation area; and
   positioning the first inventory holder at the presentation area such that one or more items are presented and available to be selected from the first inventory holder by the user.

16. The method of claim 15, further comprising:
   determining that the adjustment criteria associated with the presentation area is satisfied.

17. The method of claim 15, wherein the adjustment criteria is at least one of: a time of a day, a day of a week, a season, a holiday, a weather, a user located in the materials handling facility, an agreement with a vendor of an item located in the materials handling facility, an agreement with a manufacturer of an item located in the materials handling facility, or an agreement with a seller of an item located in the materials handling facility.

18. The method of claim 15, further comprising:
   determining that a percentage of an item presented at the presentation area has been picked from the presentation area.

19. The method of claim 18, further comprising:
   removing a third inventory holder from the presentation area that contains the item to be replenished; and
   positioning a fourth inventory holder at the presentation area.

20. The method of claim 15, wherein:
   the presentation area includes a plurality of presentation locations; and
   for each presentation location:
      at least one inventory holder of the plurality of inventory holders is removed from the presentation location; and
      at least one other inventory holder of the plurality of inventory holders is positioned at the presentation location according to the adjustment criteria.

* * * * *